(12) United States Patent
Argoubi

(10) Patent No.: US 8,843,971 B2
(45) Date of Patent: Sep. 23, 2014

(54) DIGITAL DEVICE SYSTEM

(75) Inventor: Ali Argoubi, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1183 days.

(21) Appl. No.: 12/374,978

(22) PCT Filed: May 14, 2007

(86) PCT No.: PCT/JP2007/059871
§ 371 (c)(1),
(2), (4) Date: Jan. 23, 2009

(87) PCT Pub. No.: WO2008/012977
PCT Pub. Date: Jan. 31, 2008

(65) Prior Publication Data
US 2010/0023973 A1    Jan. 28, 2010

(30) Foreign Application Priority Data
Jul. 24, 2006  (JP) .................. 2006-200901

(51) Int. Cl.

| | | |
|---|---|---|
| H04N 7/18 | (2006.01) | |
| G06F 3/00 | (2006.01) | |
| G06F 13/00 | (2006.01) | |
| H04N 5/445 | (2011.01) | |
| H04N 7/173 | (2011.01) | |
| H04N 7/16 | (2011.01) | |
| H04N 21/436 | (2011.01) | |
| H04N 21/472 | (2011.01) | |
| H04N 5/85 | (2006.01) | |
| H04N 21/433 | (2011.01) | |
| H04N 21/41 | (2011.01) | |
| H04N 5/781 | (2006.01) | |

(52) U.S. Cl.
CPC ..... *H04N 5/44543* (2013.01); *H04N 21/43622* (2013.01); *H04N 5/781* (2013.01); *H04N 21/47214* (2013.01); *H04N 5/85* (2013.01); *H04N 21/4334* (2013.01); *H04N 21/4135* (2013.01)
USPC .............. 725/85; 725/39; 725/100; 725/142

(58) Field of Classification Search
None
See application file for complete search history.

(56) References Cited

U.S. PATENT DOCUMENTS

| | | | |
|---|---|---|---|
| 5,065,235 | A | 11/1991 | Iijima |
| 5,576,773 | A | 11/1996 | Itagaki et al. |

(Continued)

FOREIGN PATENT DOCUMENTS

| | | | |
|---|---|---|---|
| JP | 2-250485 | A | 10/1990 |
| JP | 4-239888 | A | 8/1992 |

(Continued)

OTHER PUBLICATIONS

'Sharp Toriatsukai Setsumeisho Ekisho Color TV Keimei LC-37AD1 AQUOS (Sosahen)' Jul. 9, 2003, (Seihin Hatsubaibi), pp. 92 to 94, 99,151 to 164 <http://www.sharp.co.jp/support/aquos/doc/1c37ad1_ope.ped>.

(Continued)

*Primary Examiner* — Mark D Featherstone
(74) *Attorney, Agent, or Firm* — Birch, Stewart, Kolasch & Birch, LLP

(57) ABSTRACT

When one program is selected from an EPG display screen, a flow goes to a screen prompting for selection of a program reservation method. When recording reservation is selected, the flow goes to a menu screen for selecting a recording reservation method. When video reservation is selected it is determined whether a video-linked recording setting completion flag is not yet set. If not yet set (YES), and when a video controller is not to be used, "the video controller is not to be used" is set for video-linked recording setting. Next, the video-linked recording setting completion flag is set to "already set", and thereby, reservation registration can be continued. When reservation of a program selected from an EPG is selected, the program is video-reserved, and the flow returns to the EPG screen.

10 Claims, 16 Drawing Sheets

(56) References Cited

U.S. PATENT DOCUMENTS

| | | | |
|---|---|---|---|
| 5,731,844 A * | 3/1998 | Rauch et al. | 725/40 |
| 5,828,417 A | 10/1998 | Itagaki et al. | |
| 6,252,590 B1 * | 6/2001 | Sawai et al. | 345/667 |
| 7,900,237 B2 * | 3/2011 | Kwon et al. | 725/139 |
| 2002/0157098 A1 * | 10/2002 | Zustak et al. | 725/51 |
| 2006/0062544 A1 | 3/2006 | Southwood et al. | |
| 2006/0259931 A1 | 11/2006 | Kikkoji et al. | |

FOREIGN PATENT DOCUMENTS

| | | |
|---|---|---|
| JP | 7-75030 A | 3/1995 |
| WO | WO-2005/006577 A1 | 1/2005 |
| WO | WO 2005/112312 A1 | 11/2005 |

OTHER PUBLICATIONS

'Sharp Toriatsukai Setsumeisho Ekisho Color TV Keimei LC-37BD1W LC-37BD2W AQUOS (Sosahen)', Mar. 1, 2006, (Seihin Hatsubaibi), pp. 104,105, 114, 115, 120, 121, 128 to 133, <http://www.sharp.co.jp/support/aquos/doc/1c37bd1-2w_ope.pdf>.

"High-Definition Multimedia Interface Specification Version 1.1 May 20, 2004", 2004 Nen 5 Gatsu 20 Nichi, p. CEC-21-p. CEC-36 "CEC13 CEC Features Description", <URL:http://www.hdmi.org/download/HDMI_Specification_1.1.pdf>.

'Sharp Toriatsukai Setsumeisho Ekisho Color TV Keimei LC-37GX1W LC-37GX2W AQUOS (Sosahen)', Sep. 1, 2006, (Seihin Hatsubaibi), pp. 168-170, <http://www.sharp.co.jp/support/aquos/doc/1c37gx1-2w_cnet.pdf>.

Korean Notice of Allowance for Application No. 10-2009-7003651, dated Dec. 20, 2010.

HDMI Licensing, LLC., "High-Definition Multimedia Interface Specification Version 1.2", Supplement 1, Aug. 22, 2005, pp. I-VI, 1, XP003003035, *CEC-29-CEC-30*.

* cited by examiner

DIGITAL DEVICE SYSTEM

BACKGROUND OF THE INVENTION

1. Field of the Invention

The present invention relates to a digital device system related to a digital broadcast receiver and a recording/reproducing device, and particularly relates to a technique which provides various functions when a plurality of devices are connected.

2. Description of the Related Art

As the newest standard with general versatility for connecting a plurality of digital household electric appliances, for example, the HDMI standard has been defined. In the HDMI standard, CEC (Consumer Electronics Control) protocol is used. By using the CEC protocol, coordination of the devices connected by the HDMI cables is designed.

TABLE 1

| CEC COMMANDS | |
|---|---|
| COMMON CODE | VENDER UNIQUE CODE |
| Image View On | MENU SETTING TRANSFER |
| Active Source | PROGRAM INFORMATION |
| User Control Pressed | SPECIAL REMOTE CONTROL KEY |
| Record On | DETAILED ERROR NOTIFICATION |
| Record Off | |
| StandBy | |
| Set Stream Path | |
| STANDARD ERROR MESSAGE | |

Table 1 shows examples of CEC commands, and the CEC commands are broadly divided into a common code which is provided for keeping general versatility and is common without depending on each appliance or a vender, and a unique code unique to a vender for allowing the degree of freedom, which the vender can uniquely define.

For example, a coordination system which allows a device to have a function by using the vender unique code (command) of the HDMI has been announced.

Conventionally, video-linked recording reservation by coordination of a digital television receiver and a recording/reproducing device by using a video controller has been practicable. FIG. 11 is a diagram showing a flow of general processing of recording reservation processing in the case in which a digital television receiver and a recording/reproducing device are connected with the HDMI cable, which is processing relating to video-linked reservation.

As shown in FIG. 11, an EP G is displayed from a TV side in step S101. When a user enters program reservation processing from the EPG, GUI for selecting a program reservation method is displayed on the television side as shown in step S102. When the recording reservation is selected here, the GUI is switched to GUI for selecting a recording reservation method as shown in step S103. When video reservation is selected, it is determined whether a video-linked recording setting flag is unset or not in step S104.

When it is unset, the flow goes to step S105, and GUI concerning whether to perform video-linked setting or not is displayed. When "to perform the video-linked setting" is selected here, the flow goes to step S112, the type of controller is set, and in step S114, the video controller which is set in step S112 is set with regard to the video-linked recording setting. When the choice of nonuse of a video controller is selected in step S113, nonuse of a video controller is set in step 115 with regard to video-linked recording setting. Next, in step S116, a video-linked recording setting completion flag is set to "already set".

When entering step S112 from a menu screen S11 instead of the EPG screen S101, the flow goes through the same route and reaches step S117.

In step 117, it is determined whether the entry screen is the menu S1 or the reservation setting screen S101 of the EPG, and in the case of the menu, the flow returns to step S111. In the case of the reservation setting screen, it is determined whether the program is to be video-reserved or not in step S106. When it is to be reserved, the flow goes to step S107, "This program is reserved." is displayed, and the flow returns to the EPG S101 by a return button. In the case of "already set" in step S104 (NO), the flow goes to step S106. Meanwhile, when "not to perform the setting" is selected in step S105, the flow returns to the EPG screen of Step S102.

In this manner, selection/non-selection of the video-linked recording can be performed respectively in the case of entering from the EPG screen and in the case of entering from the menu screen.

As shown in FIG. 12, when a user who does not set a video controller is to make video reservation, the instruction manual describes "complete setting from the menu S111", and therefore, if the video-linked recording setting completion flag is set to "already set" in step S116 after going through the route A from the menu S111, by proceeding in the sequence of S111, S113, S115, S116, S117 and S111 as in the route A, reservation can be made subsequently in the sequence of S102 (recording reservation), S103 (video reservation), S104 (NO) to S106 (reserve) and S107 as shown in the route B, from the EP G screen S101.

SUMMARY OF THE INVENTION

Problems to be Solved by the Invention

However, as shown in FIG. 13, when the user who does not use a video controller makes video reservation, if he or she does not know that it is necessary to complete setting from the menu S111 (or if he or she finds it troublesome) though the manufacturer expects the user to go Through S101, S102 (recording reservation), S103 (video reservation), S104 (Yes), 8105 (set), and the route C of S113, S115, S16, S117, S107 and S101, there arises the problem that the user enters the loop shown by the route D of S105 (not set) and S102 from step S104, and cannot exit the loop.

The present invention has an object to provide a technique which allows processing concerning reservation recording without entering the loop route as described above even when setting from a menu is not completed.

Means for Solving the Problems

According to one aspect of the present invention, there is provided a digital device system having a recording/reproducing device capable of recording a digital broadcast, and a television device capable of receiving a digital broadcast, and capable of link control of linking the aforesaid recording/reproducing device and the aforesaid television device, which is a digital device system determining whether a flag concerning setting of the link control is already set or not when a program is selected from an electronic program guide (EPG) displayed on the aforesaid television device, and displaying a selection screen which prompts for selection of use or nonuse of a linking device required for linking when the flag is not yet set, wherein when the nonuse of the aforesaid linking device is selected in the aforesaid selection screen, the same processing as in a case of making a setting of nonuse concerning the aforesaid linking device from menu display is performed.

According to the above described digital device system, when a program is selected from the electronic program guide, even when nonuse of the linking device is selected, the screen does not return to the original screen, and processing concerning the next program can be performed.

According to another aspect of the present invention, there is provided a digital device system having a recording/reproducing device capable of recording a digital broadcast, and a television device capable of receiving a digital broadcast, and capable of link control of linking the aforesaid recording/reproducing device and the aforesaid television device, which is a digital device system determining whether a flag concerning setting of the link control is already set or not when a program is selected from an electronic program guide (EPG) displayed on the aforesaid television device, and displaying a selection screen which prompts for selection of use or nonuse of a linking device required for linking when the flag is not yet set, wherein when the nonuse of the aforesaid linking device is selected in the aforesaid selection screen, control is conducted to set the nonuse of the linking device, set the aforesaid flag to already set, and accept reservation concerning the aforesaid program to shift to a selection screen for the next program from the aforesaid electronic program guide.

According to the above described system, even when nonuse of the aforesaid linking device is selected, by setting the flag concerning setting of link control to "already set", processing concerning the next program can be performed from the EPG screen without displaying the selection screen prompting for selection of use or nonuse of a linking device needed for linking when the flag is unset.

When the aforesaid linking device is an HDMI controller, screen display processing of confirming whether the HDMI controller is connected or not is preferably performed. Based on the screen display processing, a user can be prompted to confirm the connection. Further, in the above described system, when recording reservation is made, if setting of an input 4 terminal is set at "input", display to the effect is made to prompt for processing of changing it to "output". Thereby, warning concerning a setting error of the 4 terminal which is a multipurpose terminal for input and output can be performed.

According to another aspect of the present invention, there is provided a control method in digital device system having a recording/reproducing device capable of recording a digital broadcast, and a television device capable of receiving a digital broadcast, and capable of link control of linking the aforesaid recording/reproducing device and the aforesaid television device, which is a digital device system determining whether a flag concerning setting of the link control is already set or not when a program is selected from an electronic program guide (EPG) displayed on the aforesaid television device, and displaying a selection screen which prompts for selection of use or nonuse of a linking device required for linking when the flag is not yet set, wherein the method includes the step of when the nonuse of the aforesaid linking device is selected in the aforesaid selection screen, performing the same processing as in a case of making a setting of nonuse concerning the aforesaid linking device from menu display.

Further, there is provided a control method in a digital device system having a recording/reproducing device capable of recording a digital broadcast, and a television device capable of receiving a digital broadcast, and capable of link control of linking the aforesaid recording/reproducing device and the aforesaid television device, which is a digital device system determining whether a flag concerning setting of the link control is already set or not when a program is selected from an electronic program guide (EPG) displayed on the aforesaid television device, and displaying a selection screen which prompts for selection of use or nonuse of a linking device required for linking when the flag is not yet set, wherein the method includes the step of when the nonuse of the aforesaid linking device is selected in the aforesaid selection screen, performing processing so as to set nonuse of the linking device, set the aforesaid flag to already set, and accept reservation concerning the aforesaid program to shift to a selection screen for the next program from the aforesaid electronic program guide. A program causing a computer to execute these steps also comes under the category of the present invention.

Effect of the Invention

According to the present invention, there is provided the advantage of being capable of smoothly proceeding with reservation processing of a program without the processing entering a loop state even when a linked device is not used in the video reservation processing from the EPG screen.

DESCRIPTION OF SYMBOLS

A . . . digital broadcast receiver, B . . . DVD recorder, 1 . . . antenna, 3 . . . digital broadcast receiving part, 5 . . . HDMI interface part, 7 . . . HDMI signal processing part, 11 . . . decoder, 15 . . . remote control photoreceptor, 17 . . . control part (CPU), 18 . . . storage part, 21 . . . speaker, 23 . . . display, 25 . . . audio signal processing part, 27 . . . video signal processing part, 41 . . . antenna, 43 . . . digital tuner, 45 . . . HDMI signal processing part, 47 . . . control part, 51 . . . remote control photoreceptor, 53 . . . storage part (HDD), 55 . . . HDMI interface part, 57 . . . electronic program guide acquiring part, 63 . . . optical disk drive part, 67 . . . operation part

DETAILED DESCRIPTION OF THE INVENTION

Figure 1:
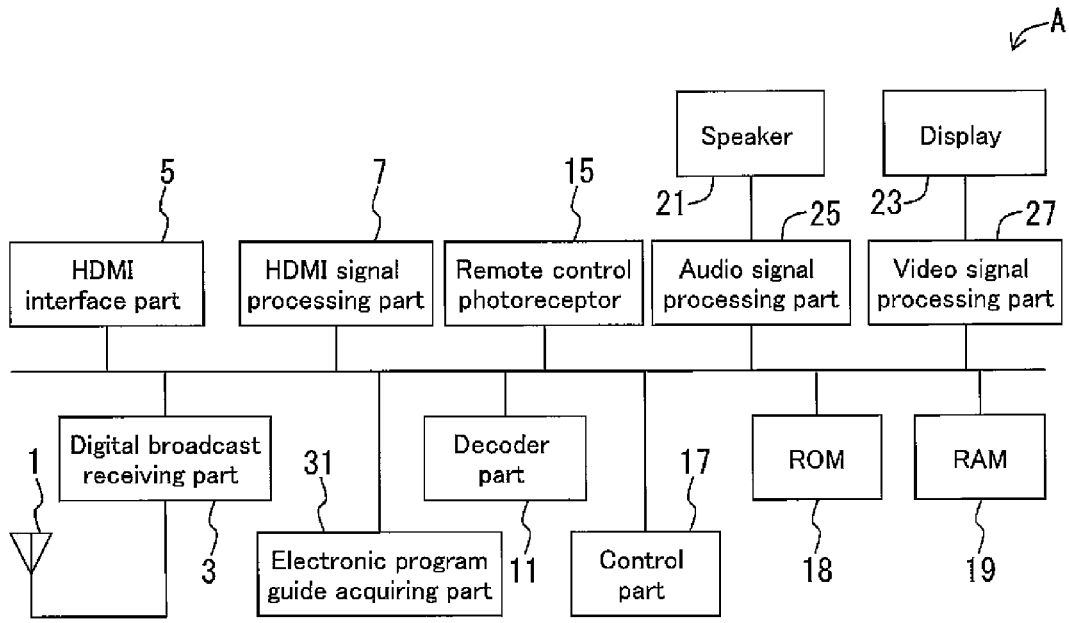
FIG. 1 is a functional block diagram showing one configuration example of a liquid crystal television device (hereinafter, called a digital broadcast receiver) capable of receiving a digital broadcast which is one example of a connection source electronic device of a system shown in the following FIG. 3.
Figure 2:
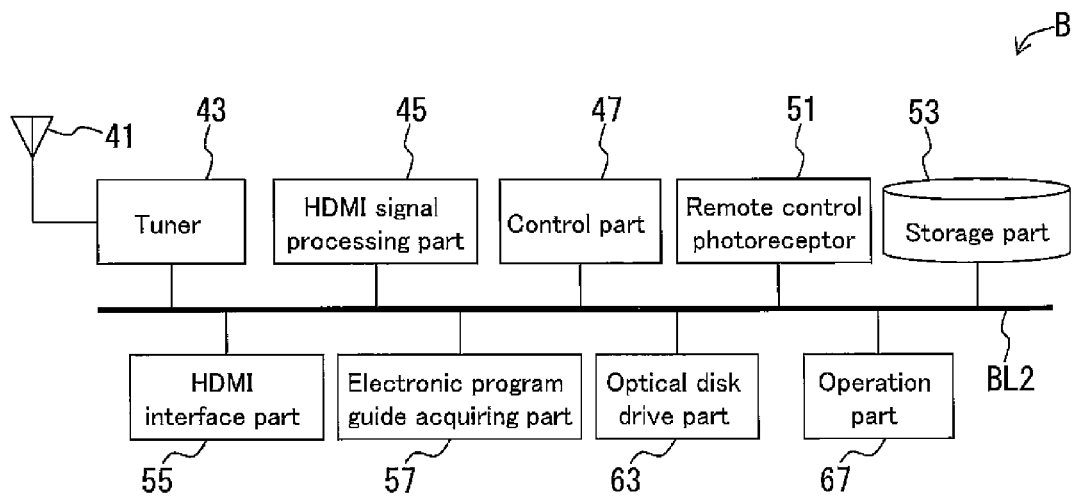
FIG. 2 is a functional block diagram showing one configuration example of a DVD recorder (recording/reproducing device) which is one example of a connection destination electronic device of the system shown in FIG. 3.
Figure 3:
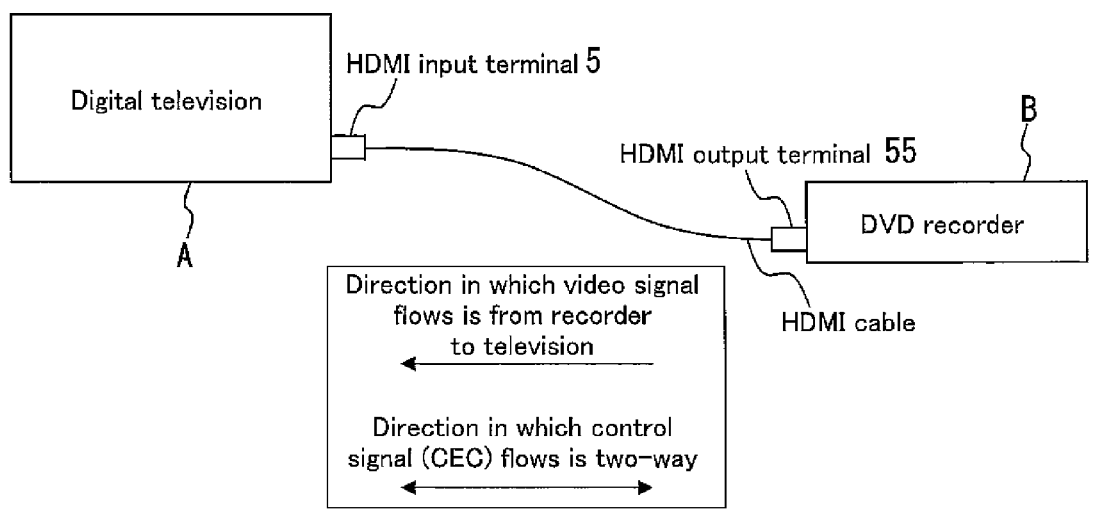
FIG. 3 is a diagram showing one configuration example of an electronic device system according to the present embodiment.

Hereinafter, an electronic device system according to an embodiment of the present invention will be described with reference to the drawings with an example of a system based on the HDMI standard. FIG. 3 is a diagram showing one configuration example of an electronic device system according to the present embodiment. FIG. 1 is a functional block diagram showing one configuration example of a liquid crystal television device (hereinafter, called digital broadcast receiver) capable of receiving a digital broadcast which is an example of a connection source electronic device of the system shown in FIG. 3. FIG. 2 is a functional block diagram showing one configuration example of a DVD recorder (recording/reproducing device) which is one example of a connection destination electronic device of the system shown in FIG. 3.

The above described Table 1 shows examples of the CEC command (code). As shown in Table 1, the CEC commands include common codes in the HDMI standard and the unique code which is unique to a vender. Here, the vender unique codes include the codes relating to transfer of menu setting, program information, a special remote control key, detailed error information and the like. More specifically, the reservation function of the recorder allows setting with the degree of freedom by a vender.

As shown in FIG. 1, a digital broadcast receiver A has an antenna 1, a digital broadcast receiving part 3 including a tuner of a digital broadcast, an HDMI interface part 5, an HDMI signal processing part 7, a decoder 1, a remote control photoreceptor 15, an audio signal processing part 25 which performs processing of an audio signal, a speaker 21 which outputs sound based on the audio signal after processing, a video signal processing part 27 which performs processing a video signal, a display 23 which outputs video based on the video signal after processing, a control part (CPU) 17 which controls each of these function blocks through a bus line, and storage parts 18 (ROM) and 19 (RAM) which store a program for performing the following processing and the other information.

As shown in FIG. 2, a DVD recorder B has an antenna 41, a digital tuner 43, an HDMI signal processing part 45, a control part 47, a remote control photoreceptor 51, a storage part (HDD) 53, an HDMI interface part 55, an electronic program guide acquiring part 57, an optical disk drive part 63 such as a DVD, and an operation part 67.

FIG. 3 is a diagram showing a state in which the HDMI input terminal 5 of the digital broadcast receiver A and the HDMI output terminal 55 of the DVD recorder B shown in FIG. 1 and FIG. 2 are connected by the HDMI cable. A video signal flows to the digital broadcast receiver A from the DVD recorder B as shown by the arrow, between the digital broadcast receiver A and the DVD recorder B, and a control signal (CEC code) flows in both directions between the digital broadcast receiver A and the DVD recorder B. Control processing between the devices can be performed based on exchange of the control signals of the CEC codes through the HDMI cable between the devices.

Figure 4A:
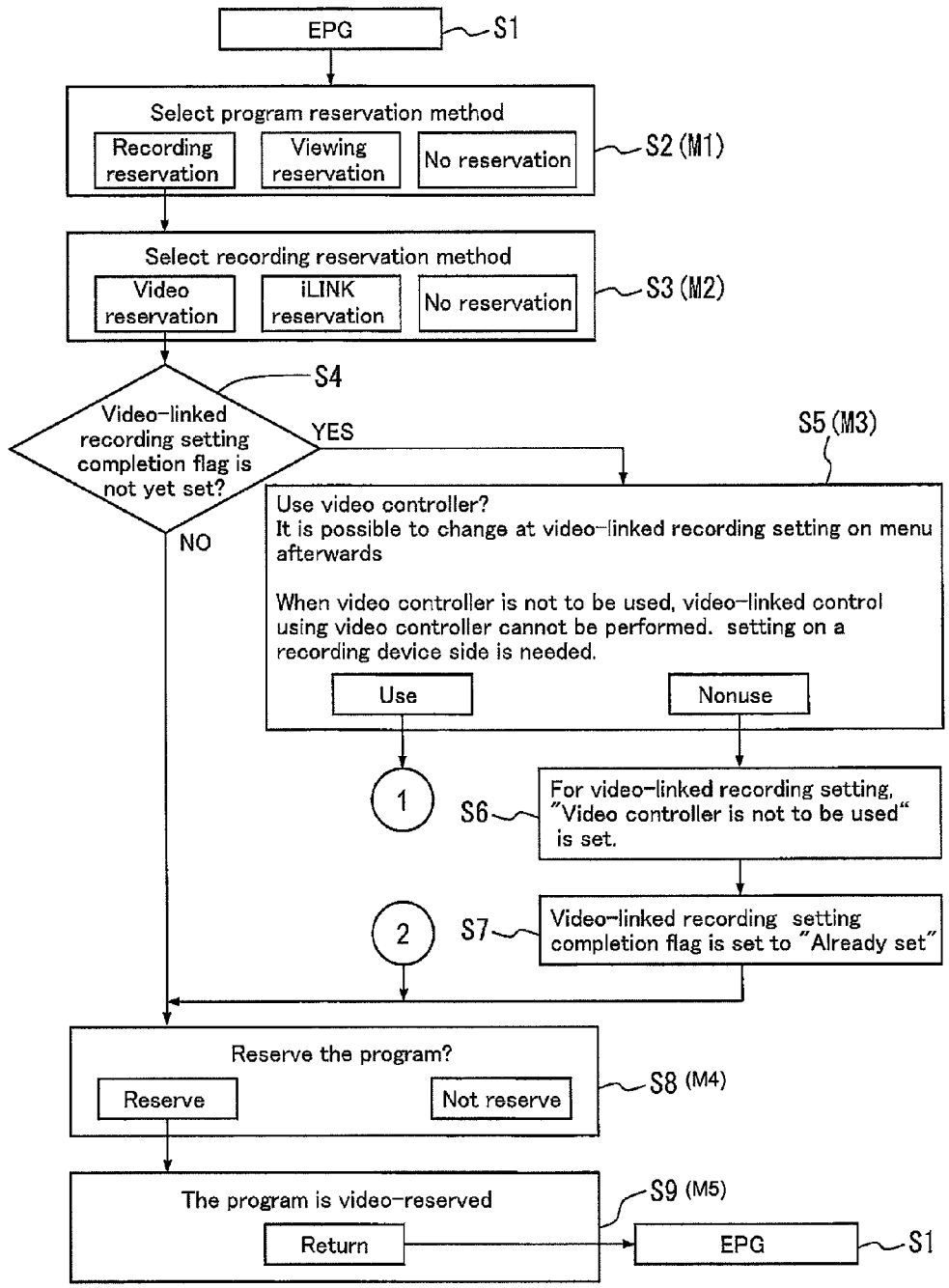
FIG. 4 is a diagram showing a flow of general processing of recording reservation processing in the case in which a digital television receiver and a recording/reproducing device are connected with the HDMI cable, which is processing related to video-linked reservation according to one embodiment of the present invention, and is a diagram corresponding to FIGS. 11 to 13.
Figure 4B:
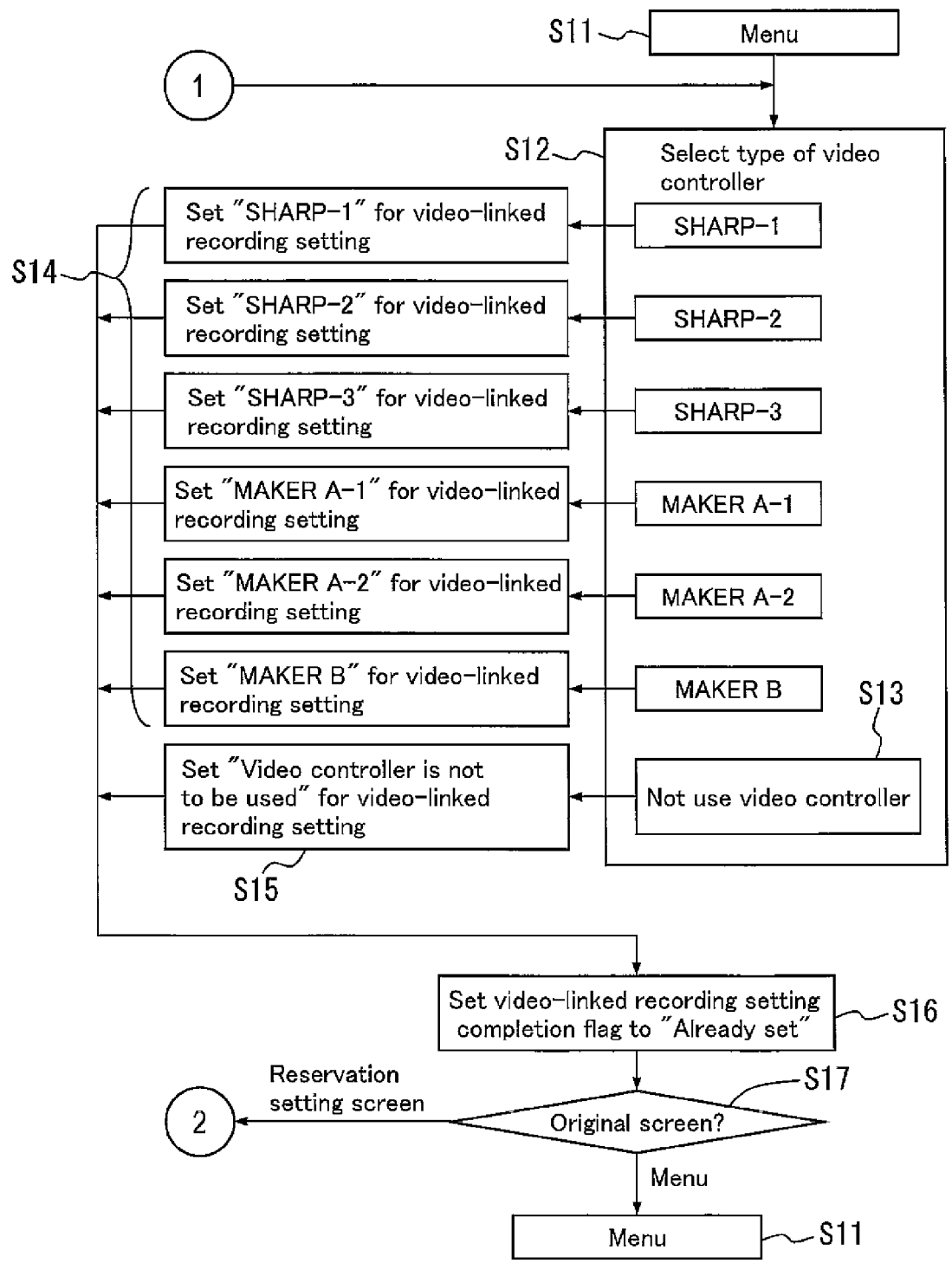
Figure 11A:
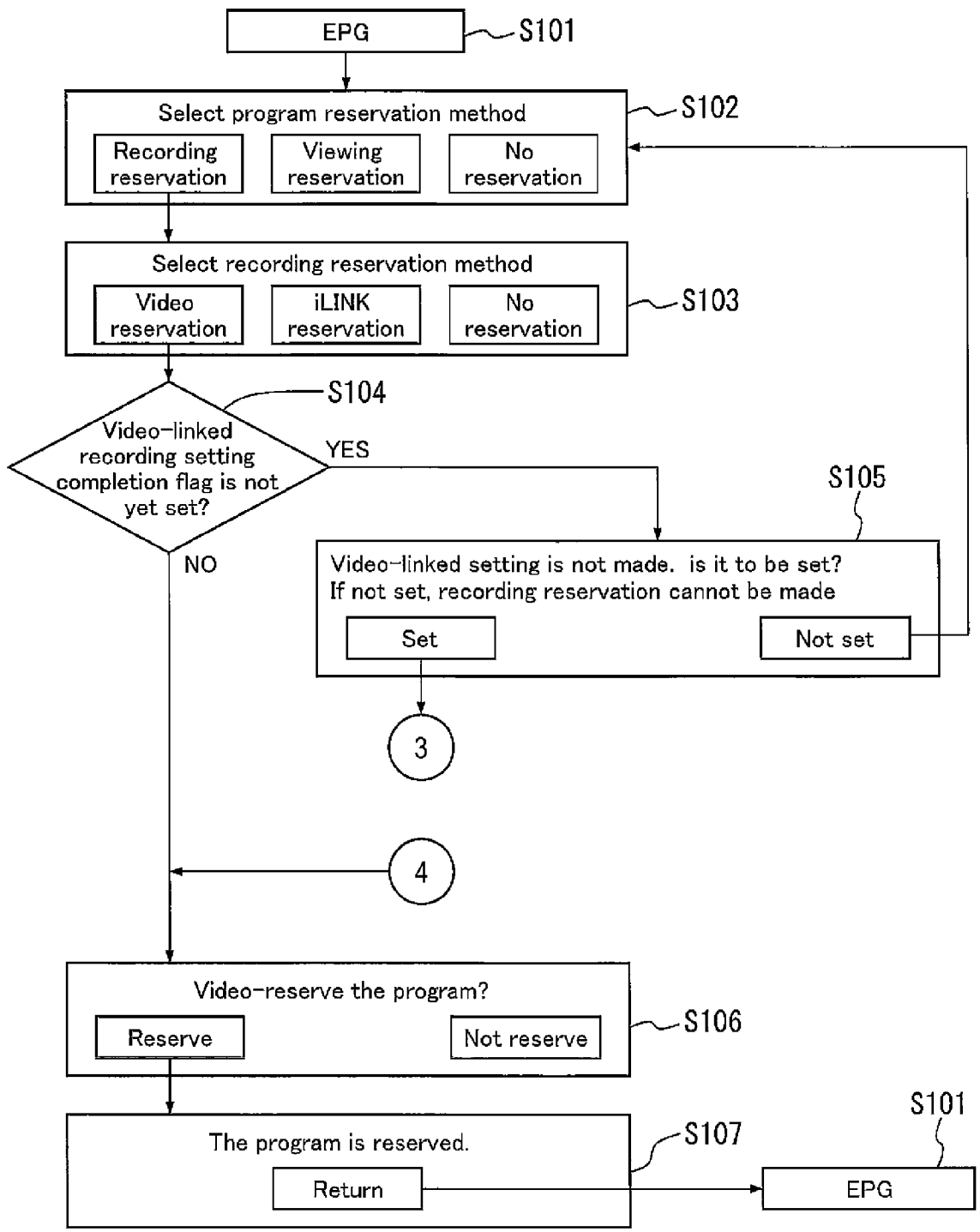
FIG. 11 is a diagram showing a flow of general processing of recording reservation processing in the case in which the digital television receiver and the recording/reproducing device are connected with the HDMI cable, which is processing relating to video-linked reservation.
Figure 11B:
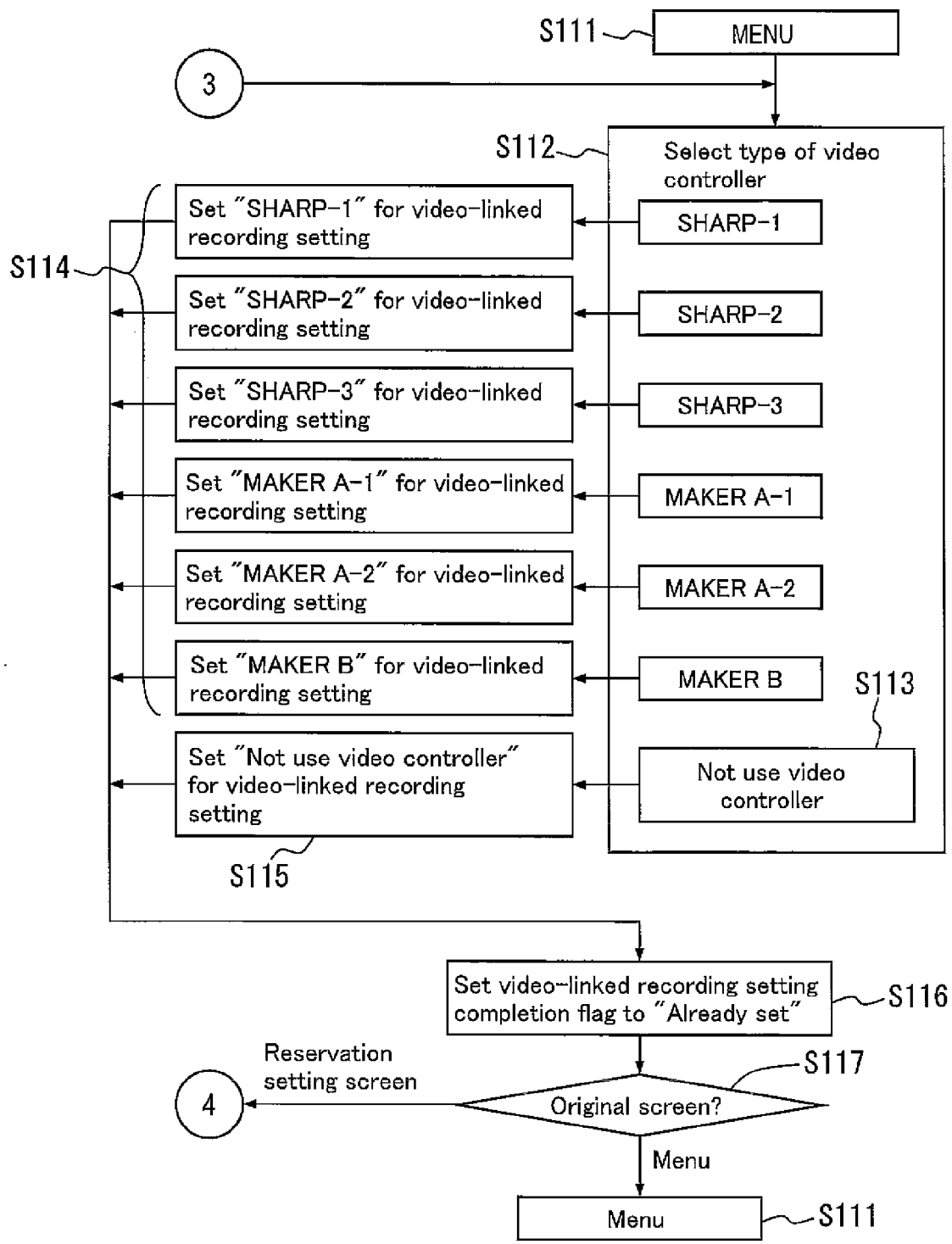
Figure 12A:
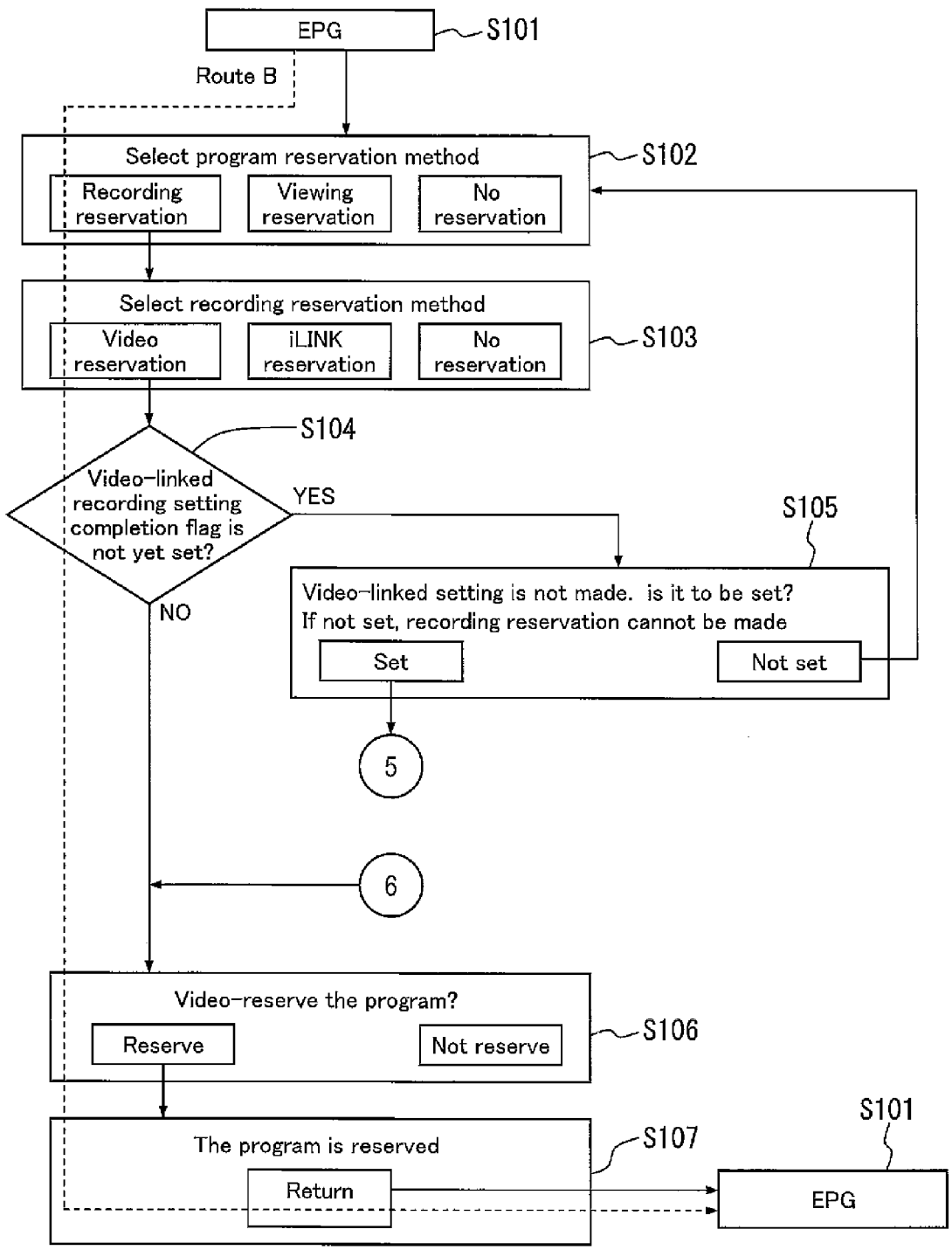
FIG. 12 is a diagram showing a flow of processing when the user who does not set a video controller makes video reservation.
Figure 12B:
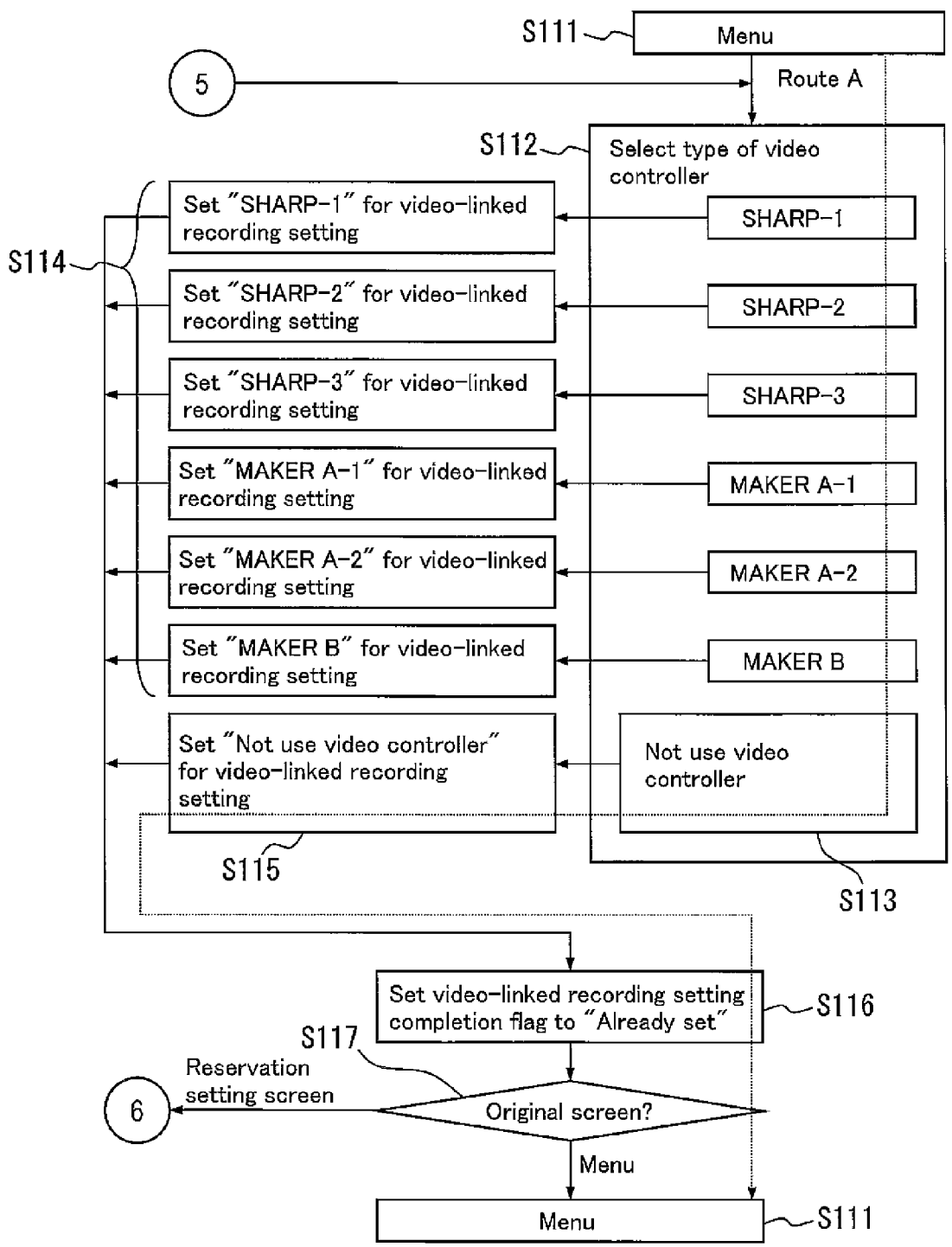
Figure 13A:
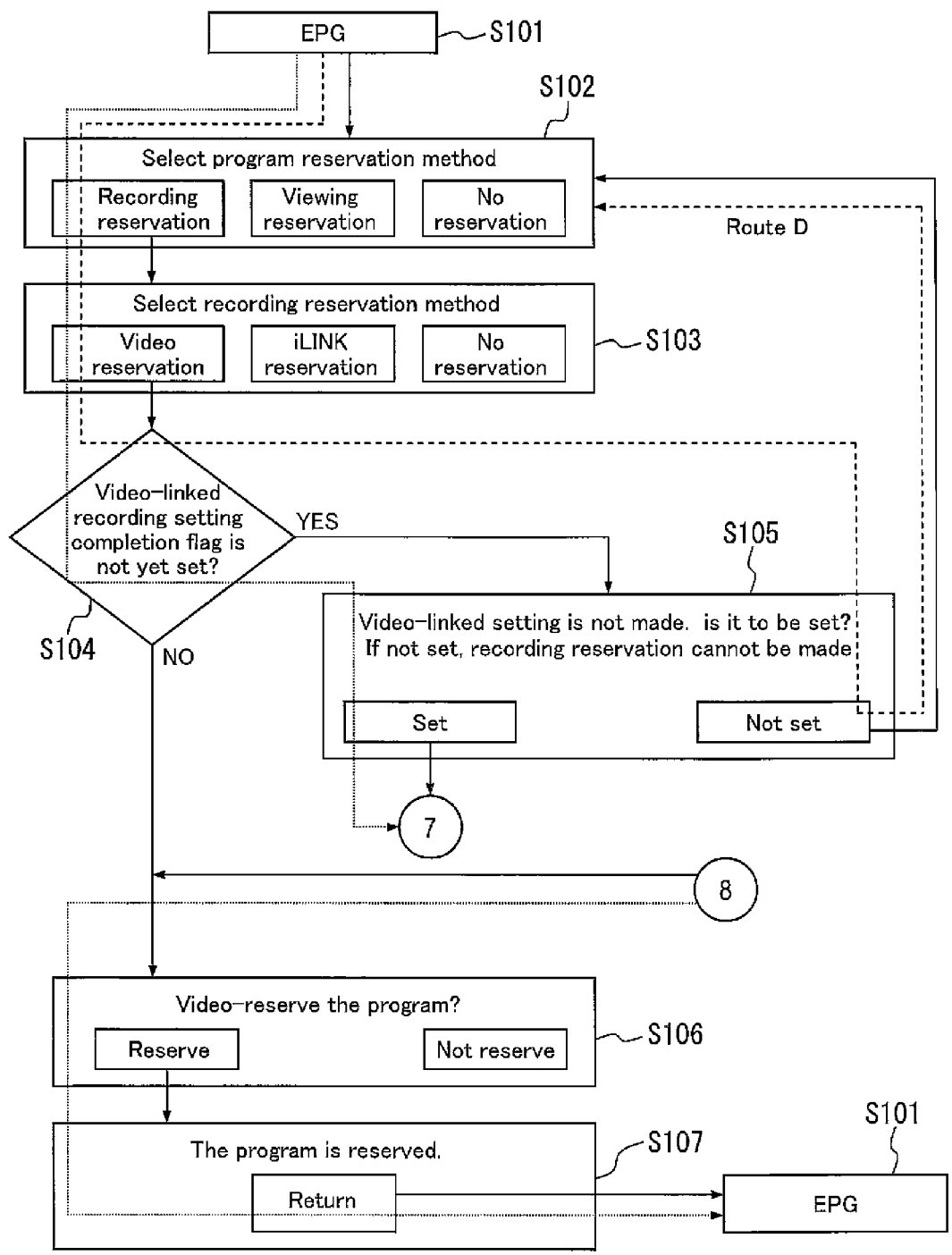
FIG. 13 is a diagram showing an example when the user who does not use a video controller makes video reservation.
Figure 13B:
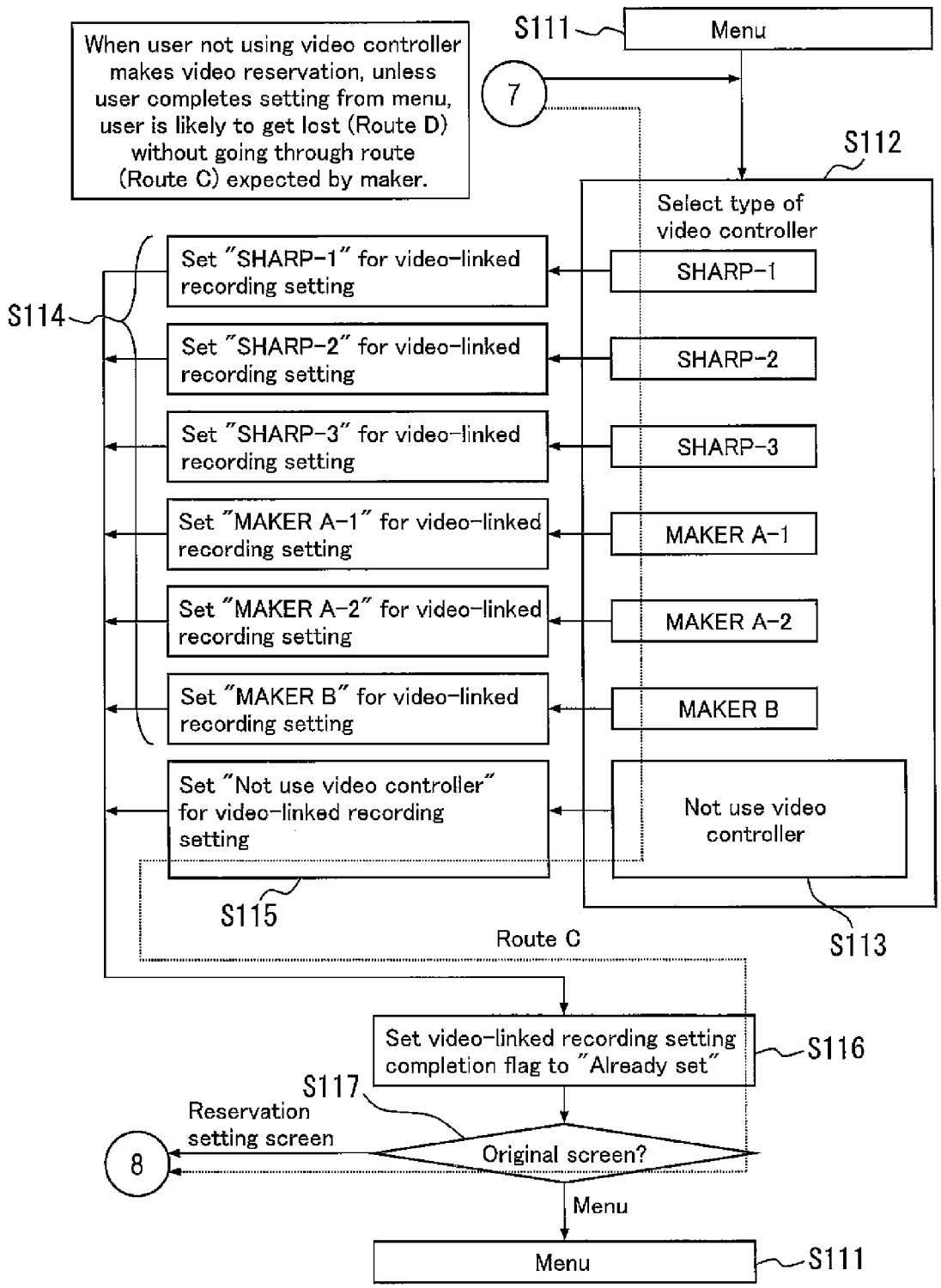

FIG. 4 is a diagram showing a flow of general processing of recording reservation processing in the case in which a digital television receiver and a recording/reproducing device are connected with the HDMI cable, which is processing relating to video-linked reservation according to the present embodiment, and is a diagram corresponding to FIGS. 11 to 13. As shown in FIG. 4, in the video-linked reservation processing according to the present embodiment, when one program is selected from an EPG display screen (step S1), the flow goes to a screen which prompts for selection of a program reservation method (step S2), and when the recording reservation is selected here, the flow goes to a menu screen for selecting a recording reservation method (step S3). When video reservation is selected here, it is determined whether or not a video-linked recording setting completion flag is not yet set in step S4 (step S4), and when it is not yet set (YES), the flow is designed to proceed to step S8 through step S6 and step S7, instead of step S2, unlike the conventional system.

More specifically, when a video controller is not used in step S5, reservation registration can be continued instead of returning to step S2. Namely, the flow goes to step S6, and video-linked recording setting is set to "nonuse of a video controller". Subsequently, in step S7, the video-linked recording setting completion flag is set to "already set". Further, the route proceeds to step S8, and when reservation of a program selected from the EPG is selected in step S8, the program is video-reserved in step S9, and the flow returns to the EPG (step S1) screen.

By forming such a mechanism, the flow goes to No in step S4 when the next program is selected from the EPG screen, and therefore, programs selected from the EPG (step S1) can be selected and video-reserved one after another, Namely, when "nonuse of the video controller" is selected in step S5 in the conventional system, the flow returns to step S2, and the route becomes loop-shaped. As a result, the user needs to enter the menu S11 and set the flag, and unless the user refers to the manual or the like, the processing becomes the one repeating the loop. However, in the present embodiment, by forming the above described new route, there is provided the advantage that the user can smoothly proceed with video reservation from the EPG screen without being at a loss as to the processing even if the user does not especially refer to the manual or the like.

In the menu screen in step S5, by the explanation "Video controller is to be used? It can be changed in video-linked recording setting of menu afterwards.", it is explained that setting concerning the video controller can be made if the user enters from the menu S11 afterwards, and by further including the explanation "when not to be used, video-linked control using the video controller cannot be performed. Setting on recording device side is needed.", the user is informed that video-linked control using the video controller cannot be conducted, setting on the recorder side is needed in a confirmatory manner. Thus, the user can continue reservation registration without confusing.

M1 through M5 in the above described FIG. 4 are reference numerals and characters designating the respective menu screens, M1 designates a menu screen which prompts for selection of a program reservation method of step S2, M2 designates a screen which prompts for selection of a recording reservation method of step S3, M3 designates a screen for selecting use or nonuse of the video controller, M4 designates a screen which prompts for the answer concerning whether a program is to be video-reserved or not, and M5 designates a screen for returning to the EPG (step S1) after making video reservation.

Figure 5:
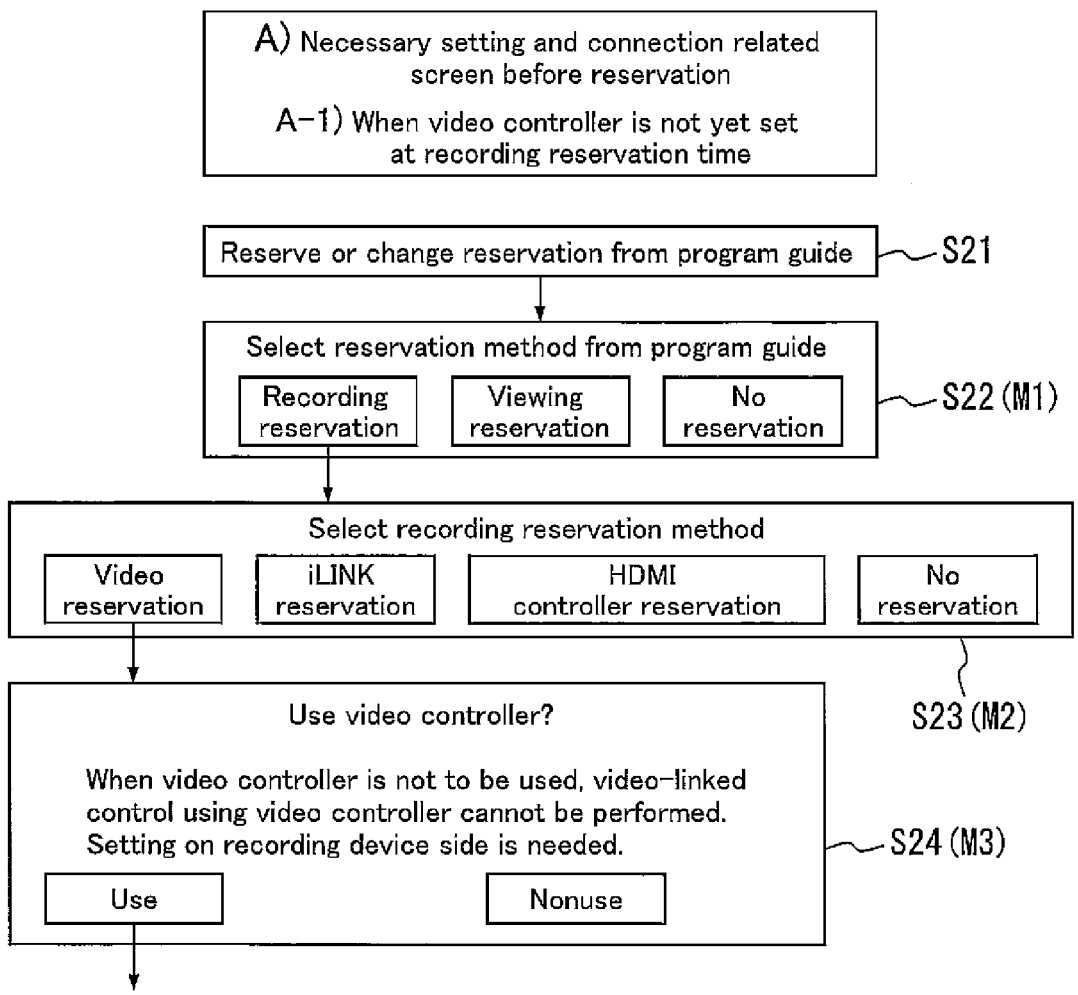
FIG. 5 is a diagram showing a menu display example when a video controller is not set yet at the time of recording reservation.
Figure 6:
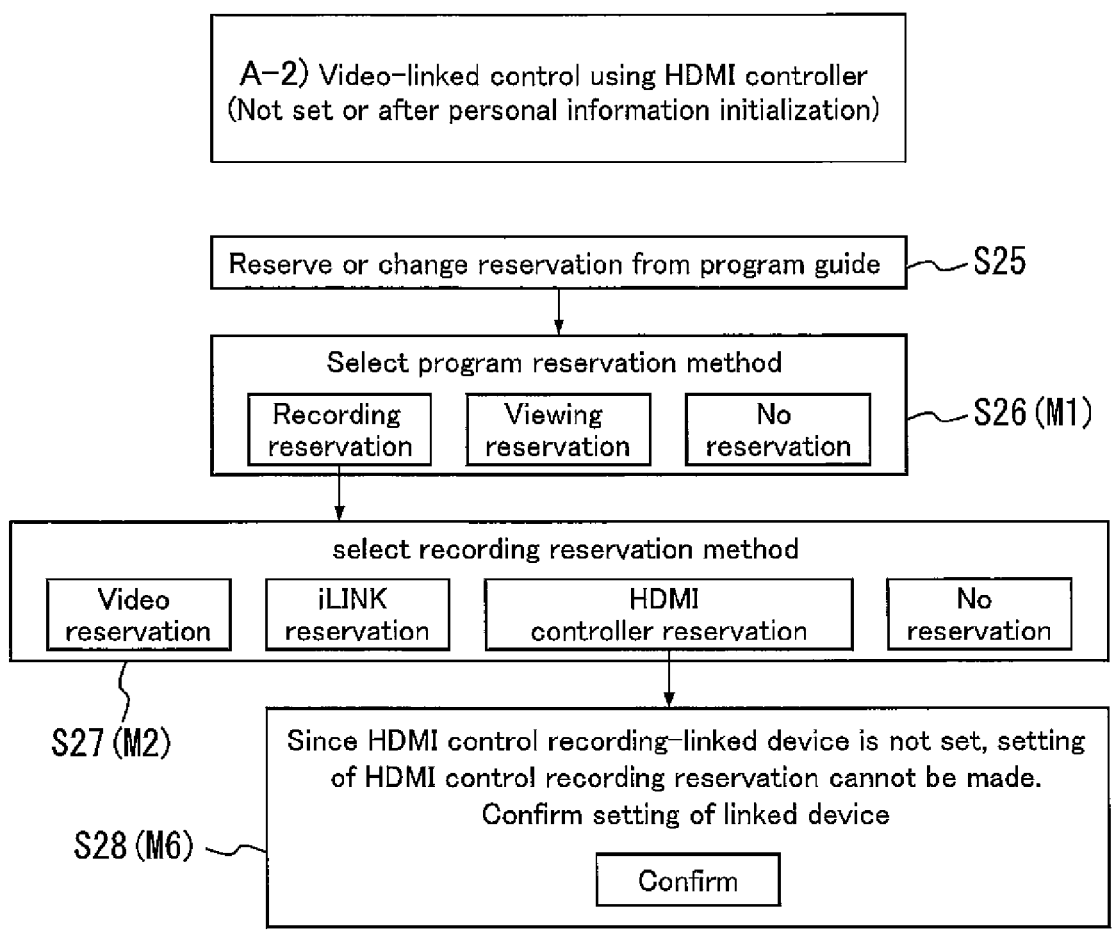
FIG. 6 is diagram showing a screen display example concerning GUI relating to video-linked control using the HDMI controller (not set, or after initialization of personal information).
Figure 7:
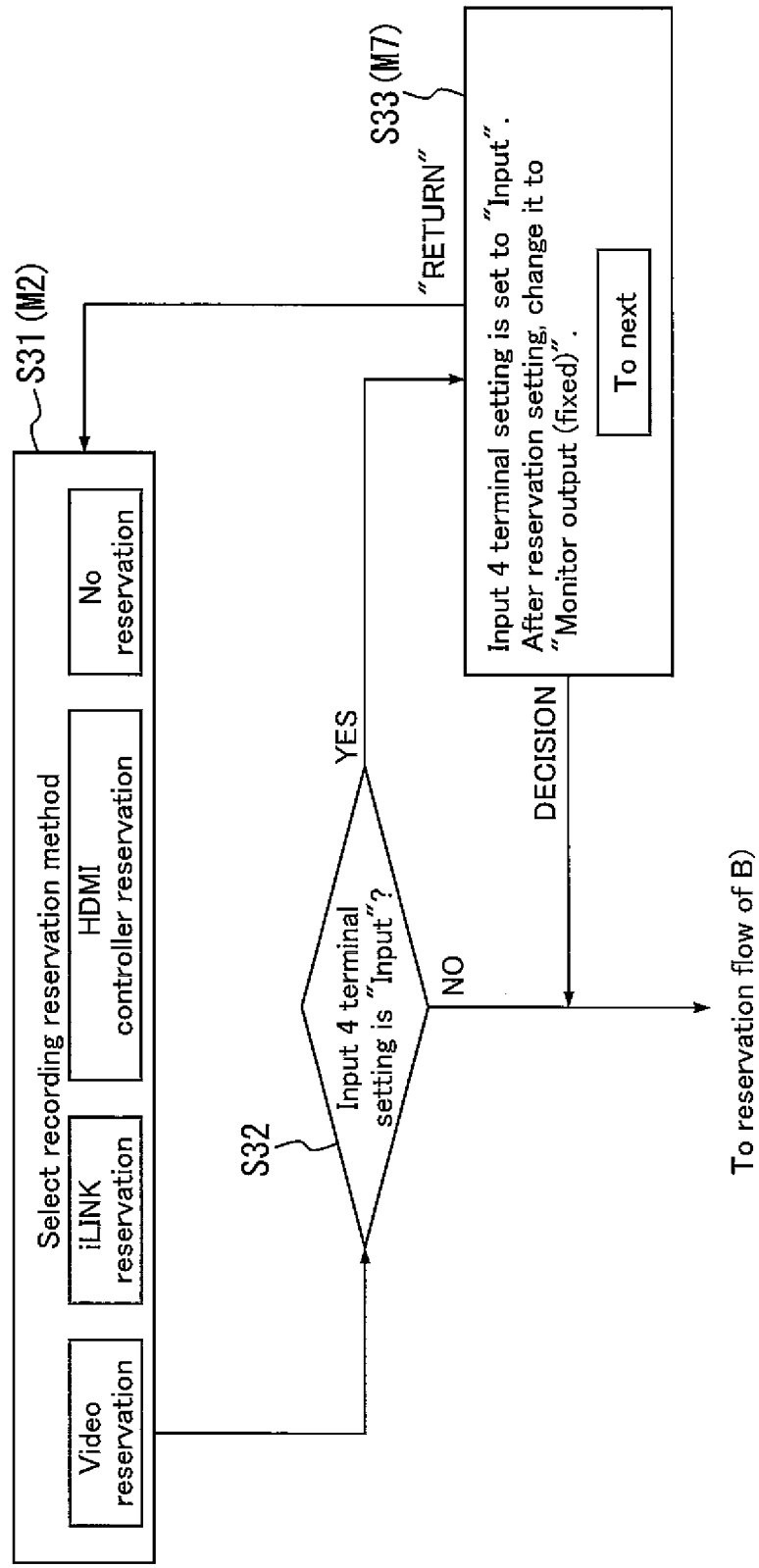
FIG. 7 is a diagram showing a display screen example when setting of an input 4 terminal, that is, the fourth terminal which is a multipurpose terminal usable as both an input terminal and an output terminal is set to "input".

Hereinafter, a video reservation registration screen according to the present embodiment will be described with reference to the drawings. FIGS. 5 to 7 are diagrams showing examples of settings required before reservation and connection related screens. FIG. 5 is a diagram showing a menu display example when the video controller is not yet set at the time of recording reservation. First, when a user desires to make reservation or reservation change from the EPG (S21), the menu screen M1 is displayed in step S22, and the user is prompted to select a program reservation method (kind of reservation such as viewing, and recording) from three choices of viewing reservation, recording reservation and not to reserve. When recording reservation by the recorder is selected here, the menu screen M2 is displayed in step S23, and the user is prompted to select a program reservation method (reservation by the video, reservation by iLINK, reservation by the HDMI and the like). As the choices in this case, for example, four choices of video reservation, iLINK reservation, HDMI controller reservation and not to reserve are displayed to prompt the user to make selection.

When the video reservation is selected here, the flow goes to step S24, and a question is posed on the screen in such a way as "The video controller is to be used?" as shown in the menu screen M3, and the explanation "When not to be used, video-linked control using the video controller cannot be performed. Setting on the recording device side is needed.", and the selection buttons of "use" and "nonuse" are presented. When "use" is selected, reservation by the video controller is performed. When "nonuse" is selected, setting on the recording device is performed.

FIG. 6 is a diagram showing a screen display example concerning GUI relating to video-linked control using the HDMI controller (not set, or after personal information initialization). As shown in FIG. 6, first, in step S25, when reservation or change of reservation from the electronic program guide (EPG) is to be made, the menu screen M1 is displayed in step S26, and the user is prompted to select the kind concerning program reservation. The choices are three, which are viewing reservation, recording reservation, and non to reserve. When the recording reservation is selected here, the flow goes to step S27, and the menu screen M2 is displayed. Here, the user is prompted to select a program reservation method (reservation means). The choices are four, which are video reservation, iLINK reservation, HDMI controller reservation and non-reservation. When video-inked control using the HDMI controller is performed, "HDMI controller reservation" is selected. At this time, when there is the problem that the target device based on the HDMI standard is not connected as shown in FIG. 6, "Since an HDMI control recording-linked device is not set, the HDMI controller recording reservation cannot be set. Confirm setting of the linked device." or the like is displayed. The display becomes a warning to make the user reconfirm connection in the case of a connection failure or being not yet connected. Here, after the user confirms the connection state or the like and takes measures in accordance with necessity, the user presses a "confirmation" button. By the processing, video-linked reservation using the HDMI controller can be made.

FIG. 7 is a diagram showing a display screen example when setting of an input 4 terminal, that is, the fourth terminal which is a multipurpose terminal usable as both an input terminal and an output terminal is set to "input". When input 4 terminal setting is set to input, the menu display M2 which prompts for selection of a recording reservation method is displayed in the menu screen M2 in step S31, the four choices of video reservation, iLINK reservation, HDMI controller reservation and non to reserve are displayed. Here, the input 4 terminal should be originally set to "output" instead of "input", and therefore, when video reservation is selected, it is determined whether the input 4 terminal is "input" or not in step S32. When it is input (YES), menu display M7 is displayed in step S33, and "Input 4 terminal is set to "input". After setting reservation, change it to "monitor output (fixed) ."" is displayed. When it is set to "output" (NO) in step S32, the flow proceeds to the reservation processing which will be described as follows. When a return key or the like of the remote control is pressed, the flow returns to step S31. After reading the warning in the menu display M7, the user presses "Next". When "Next" is pressed, the flow shifts to reservation processing of B) of FIG. 8.

Figure 8:
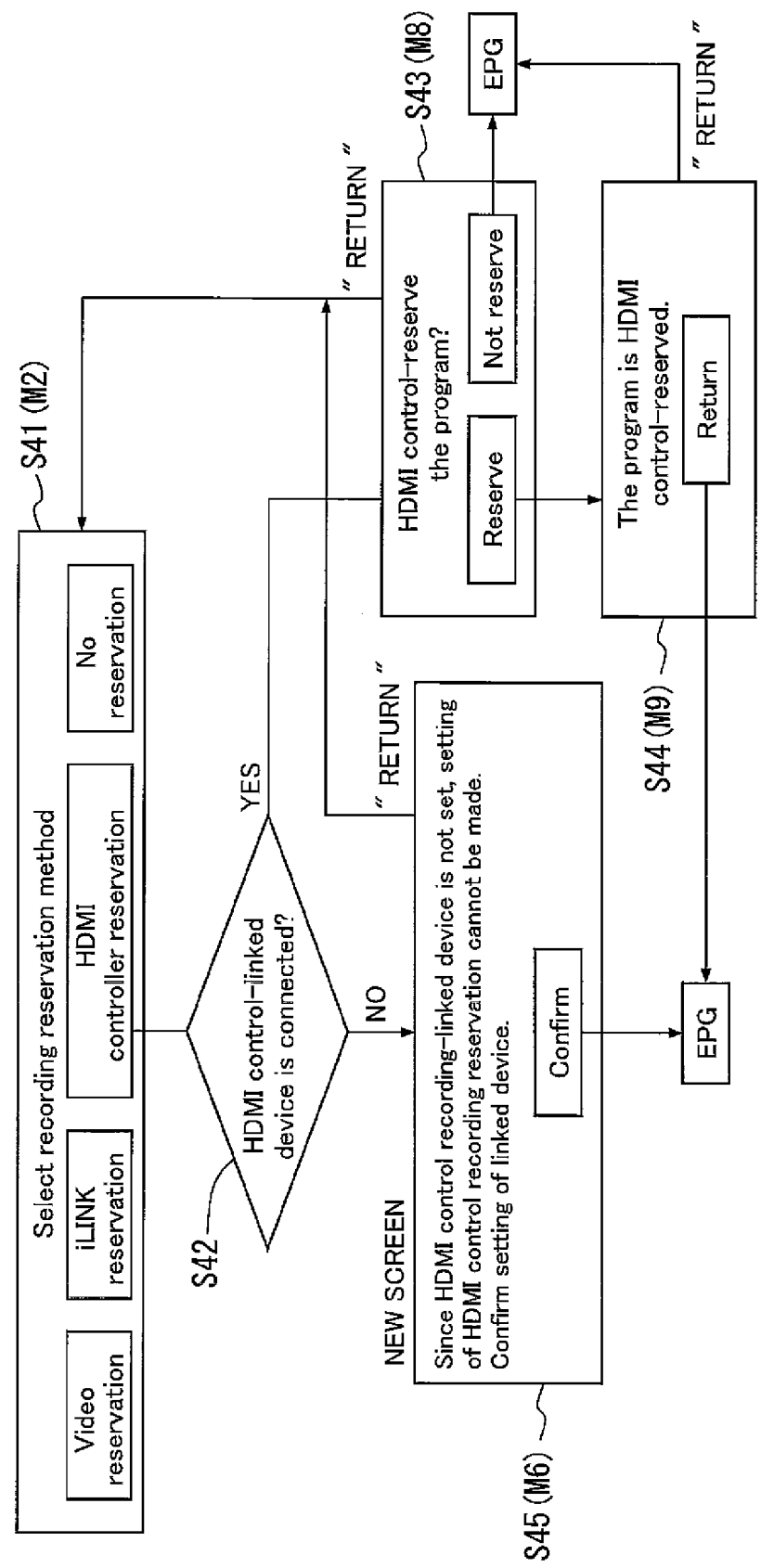
FIG. 8 is a diagram showing transition of display in HDMI controller reservation.
Figure 9:
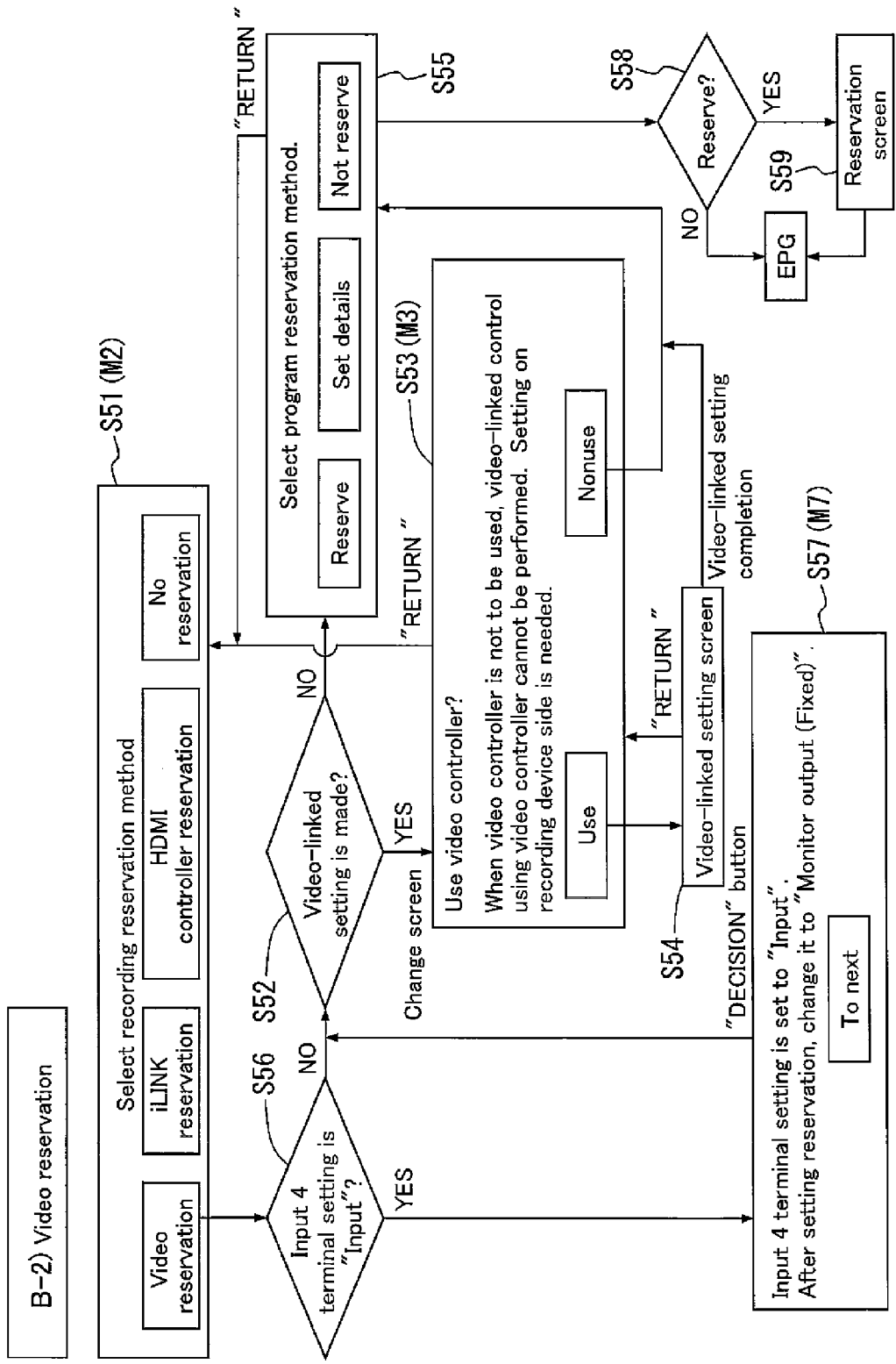
FIG. 9 is a transition diagram of a display screen concerning video reservation in a reservation flow.
Figure 10:
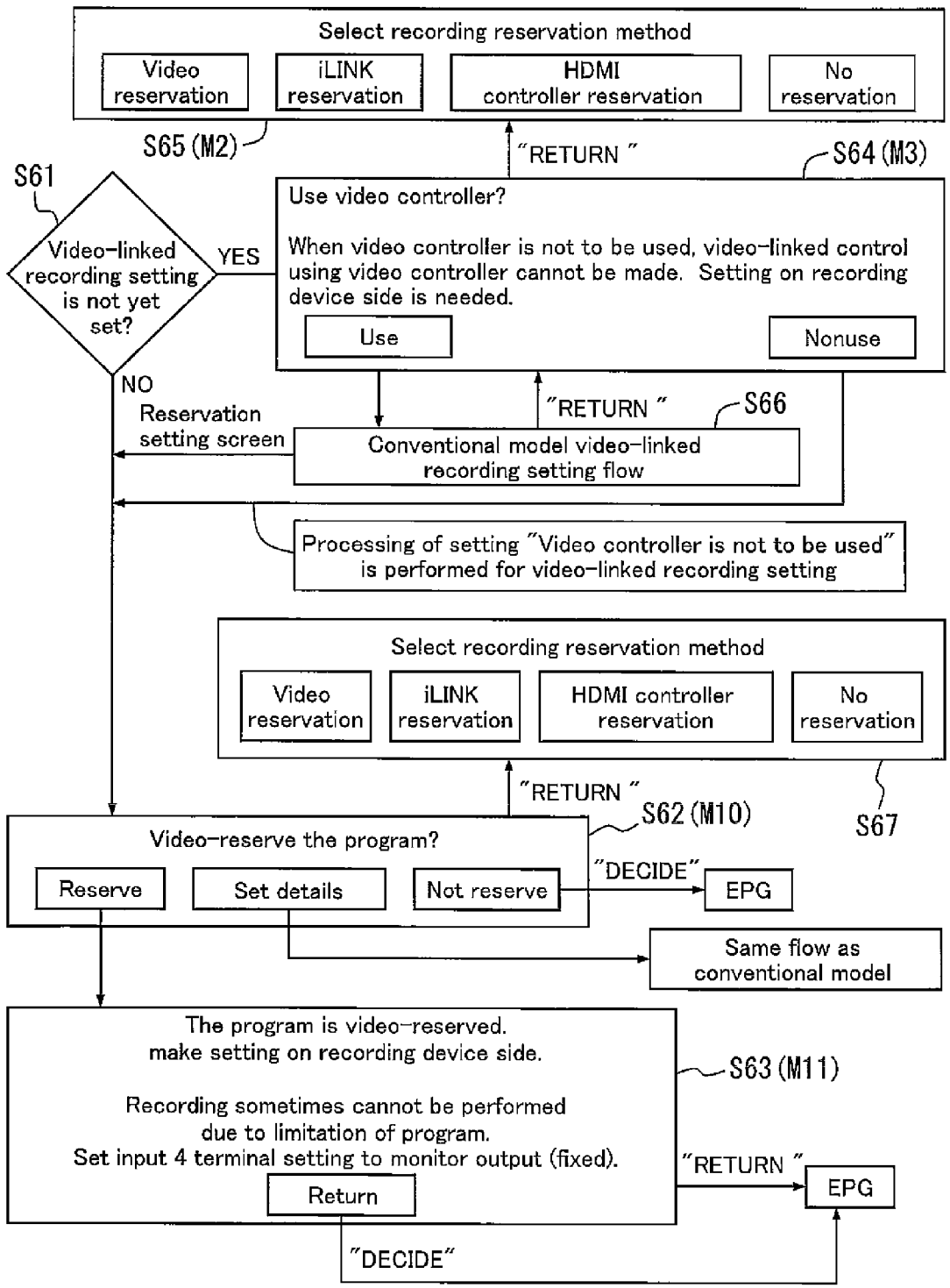
FIG. 10 is a diagram showing a processing example in the case of NO from step S56 in FIG. 9.

FIGS. 8 to 10 are diagrams showing the flow of reservation processing after registration and setting according to the above described procedure. FIG. 8 is a diagram showing transition of display in the HDMI controller reservation. First, in step S41 (menu screen M2), the user is prompted to select a recording reservation method, and four choices of video reservation, iLINK reservation, HDMI controller reservation and non to reserve are presented. When the HDMI controller reservation is selected from them, the device connection is confirmed by determining whether an HDMI controller-linked device is connected or not in step S42, and when the HDMI controller-linked device is connected (YES), menu display M8 "This program is to be HDMI controller-reserved?" is made in step S43, and the choices of to reserve and not to reserve in reality are shown for one program selected from the EPG. When the return button of the remote control or the like is pressed, the flow returns to step S41. When "not to reserve" is selected, the flow returns to the EPG screen. The user can select another program. When "to reserve" is pressed here, the flow goes to step S44, and menu display M9 "The program has been HDMI controller-reserved." is displayed. When the return or the like of the remote control is operated here, the flow also returns to the EPG screen. When the return bottom in the menu is pressed, the flow also returns to the EPG screen.

Meanwhile, when it is determined that the controller-linked device is not connected (NO) in step S42, the flow goes to step S45, and the menu screen M6 is displayed. In the menu screen M6, "Since HDMI control recording-linked device is not set, HDMI controller recording reservation cannot be set. Confirm setting of the linked device." or the like is displayed, and the user is prompted to pay attention to setting or connection. When the user confirms setting of the linked device, and presses the confirmation button, the screen returns to the EPG screen.

Next, video reservation in the reservation flow will be described with reference to FIG. 9. First, in step S51, the menu screen M2 is displayed, and the screen which prompts for selection of a recording reservation method is displayed. The choices are four that are video reservation, iLINK reservation, HDMI control reservation and non to reserve. When the user selects video reservation here, it is determined whether the input 4 terminal is "input" or not (step S56), and when it is input (YES), the flow goes to step S57, and a menu screen M7 is displayed. Here, "Input 4 terminal setting is set to "input". After setting reservation, change it to "monitor output (fixed)."" or the like is displayed, and when the operation of proceeding to the next is performed, the flow goes to step S52. When the input 4 terminal is not "input" (in the case of output) (NO) in step S56, the flow goes to step S52. It is determined whether video-linked setting is set or not in step S52, and when video-linked setting is not set (NO), the flow goes to step S55 where the selection menu for prompting the user to select a program reservation method is displayed. Here, three choices are shown. When reservation is not to be made (NO) in step S58, based on whether to reserve or not, the flow goes to the EPG, and when reservation is to be made (YES), the flow goes to step S59, and from the reservation screen, the flow goes to the EPG. When the return button of the remote control is pressed, the flow returns to step S51.

When video-linked setting is made (YES) in step S52, the flow goes to step S53, and menu display M3 relating to video linking is made. Here, "Video controller is to be used? In the case of not to use, video-linked control using a video controller cannot be performed. Setting on the recording device side is needed." or the like is displayed to prompt for selection of use or nonuse of the video controller. When the video controller is not to be used, the flow goes to step S55. When the video controller is to be used, the flow goes to a video-linked setting screen step S54 (with "return" button of the remote control, the flow can return to step S53), and after video-linked setting is finished in the video-linked setting screen, the flow goes to step S55.

Further, when the input 4 terminal is "input" (YES) in step S56, the flow goes to step S57, the menu screen M7 is displayed, and "Input 4 terminal setting is set to "input". Change it to "monitor output (fixed)" after setting reservation." is displayed. When the decision button is pressed, the flow returns to step S52.

FIG. 10 is a diagram showing a processing example in the case of NO from step S56 in FIG. 9. From step S56, the flow goes to step S61, and it is determined whether or not video-linked setting is not yet set. When it is not yet set (YES), the flow goes to step S64, and the menu M3 is displayed. In the menu M3, "Video controller is to be used? In the case of not to use, video-linked control using the video controller cannot be performed. Setting on the recording device side is needed." is displayed to prompt the user to select use or nonuse. When the return operation is performed with a remote control or the like here, "Select a recording reservation method." is displayed on the menu M2 in step S65 to prompt the user to select one from video reservation, iLINK reservation, HDMI controller reservation and non to reserve.

When "use" is selected in step S64, the flow goes to step S66, whereas when "nonuse" is selected, the flow goes to step S62. When "use" is selected, the same video-linked recording setting processing as in the conventional system is performed in step S66. Thereafter, the flow goes to step S62 from the reservation setting screen. When "return" is pressed with the remote control device or the like here, the flow also goes to step S64. When "nonuse" is selected in step S64, the flow goes to step S62. In step S62, a menu M10 is displayed, and "This program is to be video-reserved?" is displayed. The choices here are to reserve, to set details and not to reserve. When "not to reserve" is selected, the flow returns to the EPG. When "to reserve" is selected, a menu M11 is displayed in step S63. When "return" is selected with the remote control here, the flow goes to the EPG. In this menu, "Video controller is to be used? When not to be used, video-linked control using the video controller cannot be performed. Setting on the recording device side is needed." is displayed, and when "return" in the menu is selected, the flow also goes to the EPG.

As described above, there is the problem that in the processing in the flowchart shown in FIG. 4, when the user, who selects a program from the EPG and does not use a video controller, selects "Video controller is not to be used", if the user does not finish the setting of nonuse of the video controller by reentering from the menu, the flow returns to the selection screen of a program reservation method again and cannot exit the loop. In the present embodiment when the user selects "Video controller is not to be used", the processing of setting as such and forcefully setting the video-linked recording setting completion flag to "already set" is adopted, whereby there is provided the advantage that the user can make reservation of a program in sequence without being asked whether to use or not to use the video controller again and again.

Accordingly, as described by using the transition of the above described each menu display, even when a program is selected from the EPG, and the video controller is not used, the processing of reserving and registering a program in sequence can be continued.

The above described embodiment is described by taking the devices connectable based on the HDMI standard as an example, but the present invention is applicable to other iLINK devices and the like.

INDUSTRIAL APPLICABILITY

The present invention is applicable to an HDMI connection device system.

The invention claimed is:

1. A digital device system, comprising:
a plurality of recording/reproducing devices, each recording/reproducing device capable of recording a digital broadcast; and
a television device capable of receiving a digital broadcast, and capable of link control of linking said plurality of recording/reproducing devices and said television device, wherein said television device determines whether a flag concerning setting of the link control is already set or not when a program is selected from an electronic program guide (EPG) displayed on said television device;
said television device determining that the flag is not yet set;
said television device displaying a selection screen which prompts for selection of use or nonuse of linking devices required for linking the plurality of recording/reproducing devices when the flag is not yet set, wherein
when the nonuse of all of said linking devices is selected in said selection screen, the same processing as in a case of a setting of nonuse of all of said linking devices from a menu display is performed, wherein said setting of nonuse of all of said linking devices from the menu is performed prior to said program selection from the EPG.

2. A digital device system, comprising:
a plurality of recording/reproducing devices, each recording/reproducing device capable of recording a digital broadcast; and
a television device capable of receiving a digital broadcast, and capable of link control of linking said plurality of recording/reproducing devices and said television device, wherein said television device determines whether a flag concerning setting of the link control is already set or not, when a program is selected from an electronic program guide (EPG) displayed on said television device;

said television device determining that the flag is not yet set;

said television device displaying a selection screen which prompts for selection of use or nonuse of linking devices required for linking the plurality of recording/reproducing devices when the flag is not yet set, wherein when the nonuse of all of said linking devices is selected in said selection screen, control is conducted to set the nonuse of all of the linking devices, set said flag to already set, and accept reservation concerning said program to shift to a selection screen for the next program from said electronic program guide, wherein said setting of nonuse of all of said linking devices from is performed prior to said program selection from the EPG.

3. The digital device system according to claim 1, wherein each of said linking devices is a video controller.

4. The digital device system according to claim 1, wherein each of said linking devices is an HDMI controller.

5. The digital device system according to claim 1, wherein when recording reservation is made, if setting of a multipurpose terminal for input and output is set at "input", display to this effect is made to prompt for processing of changing it to "output".

6. The digital device system according to claim 4, wherein screen display processing of confirming whether the HDMI controller is connected or not is performed.

7. The digital device system according to claim 1 or 2, wherein when the use of said linking devices is selected in said selection screen, the screen shifts to a screen for setting said linking devices, and said flag is set to already set.

8. A control method in a digital device system having a plurality of recording/reproducing devices, each recording/reproducing device capable of recording a digital broadcast, and a television device capable of receiving a digital broadcast, and capable of link control of linking said plurality of recording/reproducing devices and said television device, wherein said television device determines whether a flag concerning setting of the link control is already set or not when a program is selected from an electronic program guide (EPG) displayed on said television device;

determining that the flag is not yet set;

displaying a selection screen which prompts for selection of use or nonuse of linking devices required for linking the plurality of recording/reproducing devices when the flag is not yet set, the method comprising:

when the nonuse of all of said linking devices is selected in said selection screen, performing the same processing as in a case of a setting of nonuse of all of said linking device from a menu display, wherein said setting of nonuse of all of said linking devices from the menu is performed prior to said program selection from the EPG.

9. A control method in a digital device system having a plurality of recording/reproducing devices, each recording/reproducing device capable of recording a digital broadcast, and a television device capable of receiving a digital broadcast, and capable of link control of linking said plurality of recording/reproducing devices and said television device, wherein said television device determines whether a flag concerning setting of the link control is already set or not when a program is selected from an electronic program guide (EPG) displayed on said television device;

determining that the flag is not yet set;

displaying a selection screen which prompts for selection of use or nonuse of linking devices required for linking the plurality of recording/reproducing devices when the flag is not yet set, the method comprising:

when the nonuse of all of said linking devices is selected in said selection screen, performing processing so as to set the nonuse of all of the linking devices, set said flag to already set, and accept reservation concerning said program to shift to a selection screen for the next program from said electronic program guide, wherein said setting of nonuse of all of said linking devices from is performed prior to said program selection from the EPG.

10. A non-transitory computer-readable medium that stores a program causing a computer to execute the step according to claim 8 or 9.

* * * * *